(12) United States Patent
Tanner et al.

(10) Patent No.: US 8,958,147 B2
(45) Date of Patent: Feb. 17, 2015

(54) APPARATUS FOR AIDING MANUAL, MECHANICAL ALIGNMENT OF OPTICAL EQUIPMENT

(71) Applicants: William F. Tanner, Tigard, OR (US); Marc C. Weissfloch, Portland, OR (US)

(72) Inventors: William F. Tanner, Tigard, OR (US); Marc C. Weissfloch, Portland, OR (US)

(73) Assignee: Computer Power Supply, Inc., Tigard, OR (US)

( * ) Notice: Subject to any disclaimer, the term of this patent is extended or adjusted under 35 U.S.C. 154(b) by 0 days.

(21) Appl. No.: 14/257,956

(22) Filed: Apr. 21, 2014

(65) Prior Publication Data

US 2014/0368903 A1   Dec. 18, 2014

Related U.S. Application Data

(63) Continuation-in-part of application No. 13/918,875, filed on Jun. 14, 2013, now Pat. No. 8,755,114.

(51) Int. Cl.
  *G02B 21/06* (2006.01)
(52) U.S. Cl.
  CPC ........................................ *G02B 21/06* (2013.01)
  USPC .......................................................... 359/385

(58) Field of Classification Search
  None
  See application file for complete search history.

(56) References Cited

U.S. PATENT DOCUMENTS

| | | | |
|---|---|---|---|
| 4,645,348 A * | 2/1987 | Dewar et al. .................. | 356/603 |
| 6,585,409 B2 * | 7/2003 | Schmidt et al. ............... | 374/121 |
| 7,286,286 B2 * | 10/2007 | Obuchi ......................... | 359/385 |
| 7,916,398 B2 * | 3/2011 | Bloch ........................... | 359/663 |
| 8,085,295 B2 * | 12/2011 | Tobiason et al. .............. | 348/79 |
| 8,755,114 B1 * | 6/2014 | Tanner et al. ................. | 359/387 |
| 2002/0109912 A1 * | 8/2002 | Knoblich ...................... | 359/385 |
| 2003/0067774 A1 * | 4/2003 | Lizotte ......................... | 362/236 |
| 2004/0193234 A1 | 9/2004 | Butler | |
| 2004/0223213 A1 * | 11/2004 | Fukuyama et al. ........... | 359/368 |
| 2004/0263960 A1 | 12/2004 | Obuchi | |
| 2005/0231799 A1 * | 10/2005 | Kawasaki et al. ............. | 359/385 |
| 2011/0080638 A1 * | 4/2011 | Feger ............................ | 359/385 |
| 2011/0134225 A1 | 6/2011 | Saint-Pierre et al. | |

* cited by examiner

*Primary Examiner* — Derek S Chapel
(74) *Attorney, Agent, or Firm* — Mersenne Law LLP (57) ABSTRACT

A microscope subject illumination system including a position targeting accessory that identifies a point on a subject by a distinctive illumination pattern cast on the subject. The system includes an automatic control to switch between illumination sources so that the distinctive pattern is easier to discern during subject positioning. The control may automatically extinguish the targeting illumination after a configurable period of time.

12 Claims, 9 Drawing Sheets

APPARATUS FOR AIDING MANUAL, MECHANICAL ALIGNMENT OF OPTICAL EQUIPMENT

CONTINUITY AND CLAIM OF PRIORITY

This is a continuation-in-part of U.S. patent application Ser. No. 13/918,875 filed 14 Jun. 2013.

FIELD

The invention relates to straight-line light ray type geometrical devices. More specifically, the invention relates to devices for illuminating a subject with a light pattern visible on direct examination to assist in positioning the subject for examination under increased magnification.

BACKGROUND

For centuries, scientists, engineers and technicians have used optical systems of varying complexity to assist in research, analysis, diagnosis, repair and other tasks. In particular, the microscope—generally an optical system for obtaining an enlarged view of a subject—is a mundane but indispensable tool.

Microscope users often experience a common frustration: that of locating a particular feature of a subject that is visible without magnification, but hard to find in a magnified view (or vice versa). One common solution is to provide a range of magnifications in the microscope. The desired area to examine is located and centered in the field of view under a low magnification, then progressively higher magnification objectives are swapped in until the necessary enlargement is reached. Although effective, this approach wastes time with objective-swapping and (often) re-focusing or re-centering, and if the operator disturbs the subject while adjusting the magnification, the process must be restarted. Furthermore, when the desired final magnification is not much greater than the "spotting" magnification, the method may provide only modest time savings over simply searching for the desired feature under the final magnification objective.

Alternate methods of spotting, targeting or positioning a subject on a microscope that permit rapid, direct-vision alignment to place a target location within the microscope's enlarged field of view may be of significant value.

SUMMARY

Embodiments of the invention project a light spot, cross or similar pattern onto a subject on a microscope stage. The targeting light is visible on direct examination, and is aligned so that the portion of the subject illuminated by the light will be within the microscope's enlarged field of view. The targeting light is also useful for identifying on direct view an area of the subject that was located during examination of the magnified view. Some embodiments have an auto-extinguishing feature for the targeting light, as the light may be distracting or otherwise unsuitable for use during examination of the subject (as opposed to locating or positioning the subject).

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
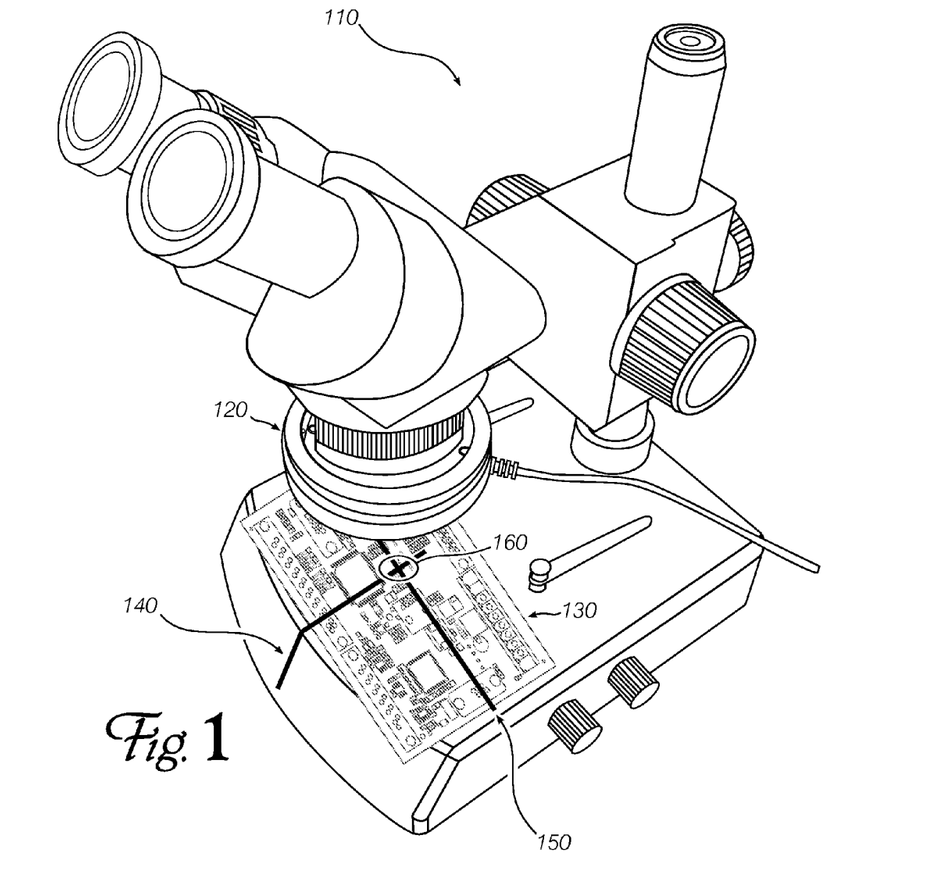
FIG. 1 shows a typical binocular microscope fitted with an embodiment of the invention.

FIG. 1 shows a generic low-power, binocular inspection microscope, also known as a dissecting microscope (generally, 110). A ring light illumination source including an embodiment of the invention is visible at 120. The ring light illuminates a printed circuit board ("PCB") 130 on the microscope's stage. The ring light includes targeting lasers that cast illuminating lines on the subject (represented in this figure by dark lines at 140 and 150). The area near the intersection of the targeting laser lines (circled at 160) is within the magnified field of view of the microscope.

To use the positioning aid, the targeting lasers are activated via a user control (e.g., a pushbutton) and the subject 130 is positioned on the microscope stage under direct vision so that the intersection of the targeting lines is near the portion of the subject to be inspected. The targeting lasers may turn off automatically after a configurable period of time, since the monochromatic laser light is not especially helpful for close examination of the subject through the microscope. The ring light may provide adjustable intensity and/or angle of illumination by regular white or colored light.

The targeting light is preferably a laser source, since the intense, monochromatic light is easy to perceive on many irregular subject surfaces. However, other embodiments may use ordinary light, or may place an opaque object between an illumination source and the subject to cast a shadow on the subject, said shadow marking the location of the microscope's field of view.

Figure 2A:
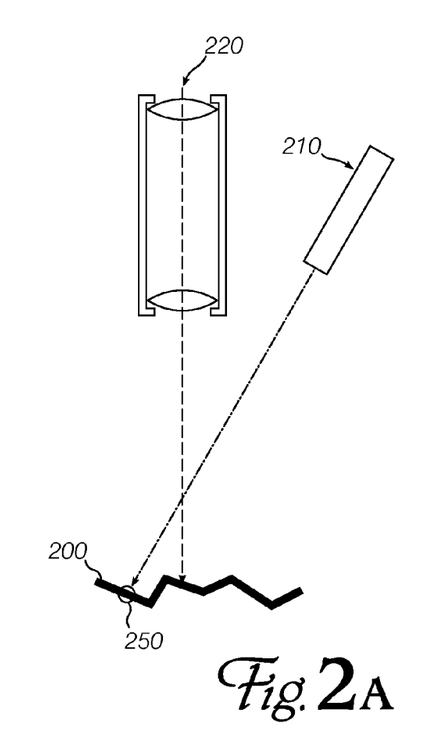
FIGS. 2A-C show how a targeting light that is not collinear with the main axis of an optical system can exhibit misalignment due to varying subject distance.
Figure 2B:
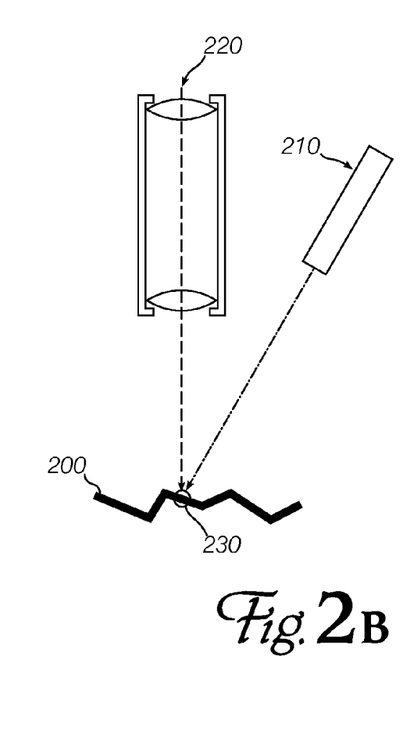
Figure 2C:
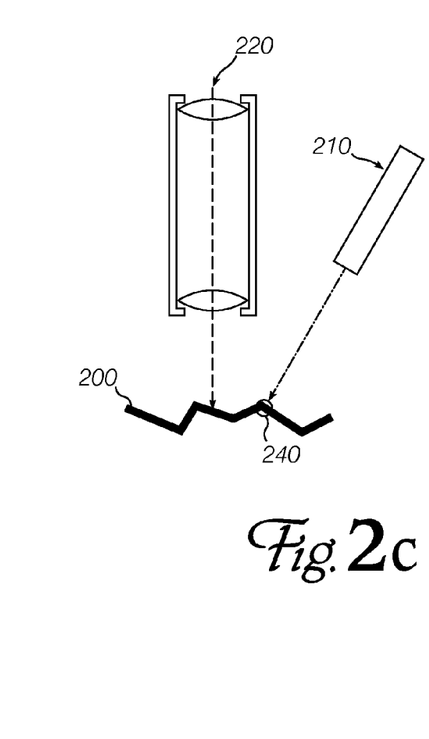

In any case, in embodiments where there is only a single targeting spot, it is important to consider the alignment of the targeting illumination relative to the microscope's field of view. For example, in FIGS. 2A-C, the targeting laser 210 is at an angle relative to the primary optical path 220. Thus, although the targeted point 230 is within the microscope's field of view in FIG. 2B, if the subject 200 is nearer to the objective (FIG. 2C) or further away (FIG. 2A), the illuminated target point moves right (240) or left (250).

Figure 3:
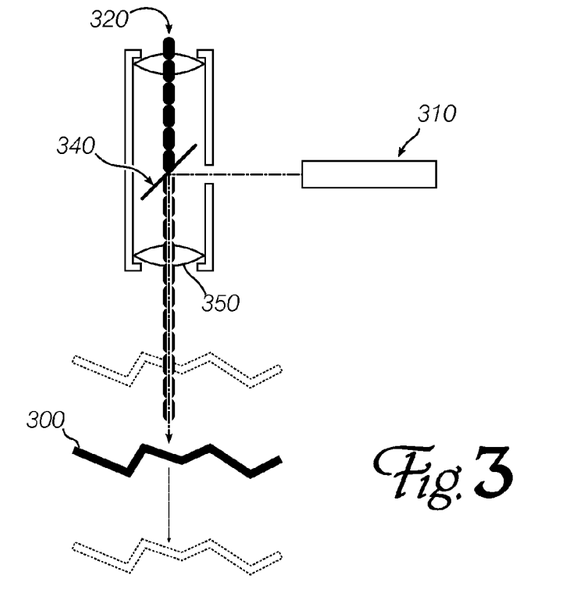
FIG. 3 shows a target positioning embodiment that avoids subject misalignment.

To remedy this problem, an embodiment may introduce the targeting illumination into the primary optical path, as shown in FIG. 3. Here, a beamsplitter or mirror 340 directs light from targeting laser 310 through the lower objective lens 350 and onto the subject 300. Since the targeting illumination is coincident with the primary optical path 320, varying distance from the lens to the subject does not alter the illuminated target location. However, this arrangement unnecessarily complicates the optical design of the microscope, and is not suitable for adding targeting to an existing microscope without a targeting illumination port or mirror. (It is appreciated that passing the targeting illumination beam through part of the microscope optics would likely disperse the beam and make it unsuitable for indicating a specific location on the subject. Additional optical or mechanical features would probably be required for this arrangement to be functional, and the added complexity makes it a disfavored implementation.)

Figure 4:
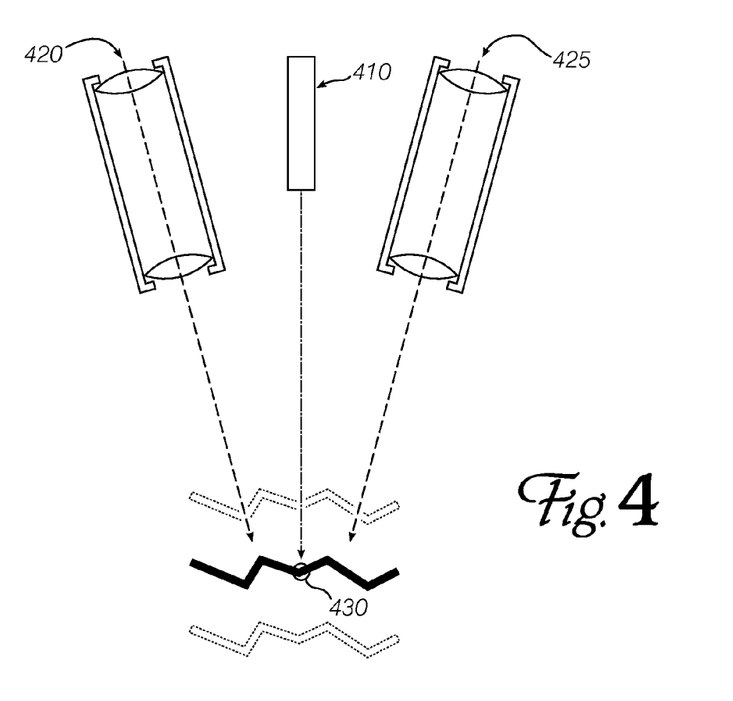
FIG. 4 shows a target positioning embodiment for a binocular optical system that does not experience misalignment.

In a binocular microscope system, represented by FIG. 4, the targeting light 410 can be placed between the left and right optical paths 420, 425, oriented so that the light projects a targeting pattern onto a subject on the microscope stage. In this position, the illuminated target 430 does not move left or right with changing subject distance, so a narrow beam, collimated or laser source can be used for target illumination. This arrangement is simple and efficient, and is a favorable embodiment for adding the functionality of the invention to an existing microscope. Targeting light 410 may be an ordinary laser or a laser fitted with a cross line generator lens to cast a cross-hair pattern on the subject. Control of the targeting light (i.e., turning the light on and off) may be clone as discussed below.

Figure 5:
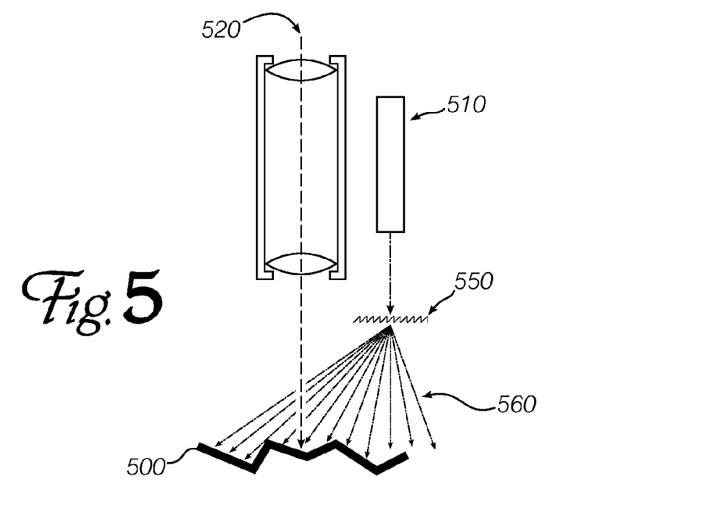
FIG. 5 illustrates a basic principle of an embodiment of the invention.

In a preferred embodiment, FIG. 5, the targeting laser 510 is displaced laterally from the primary optical path 520, and a line-generator lens 550 spreads the roughly cylindrical laser beam in one plane, creating an illuminated "fan" 560 that falls on subject 500 in a line. Note that the fan is substantially two-dimensional—it is not a cone of light, except as a result of inadvertent nonplanar dispersion. A light cone would illuminate a circle or ellipse on subject 500, and would not be suitable for this targeting mechanism.

Figure 6:
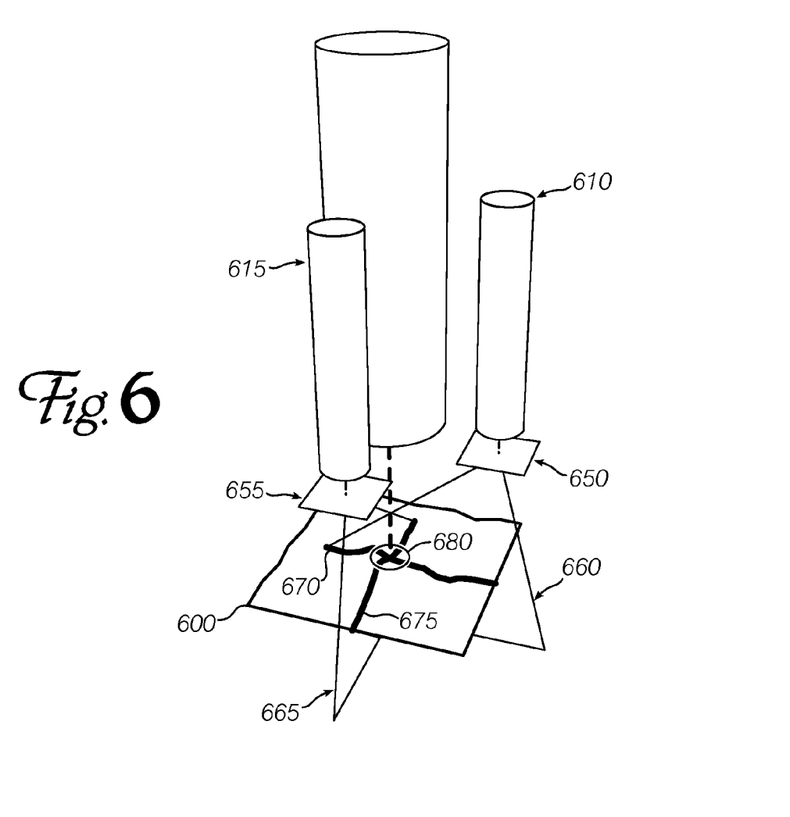
FIG. 6 is a representative model of a complete subject-positioning aid.
Figure 7:
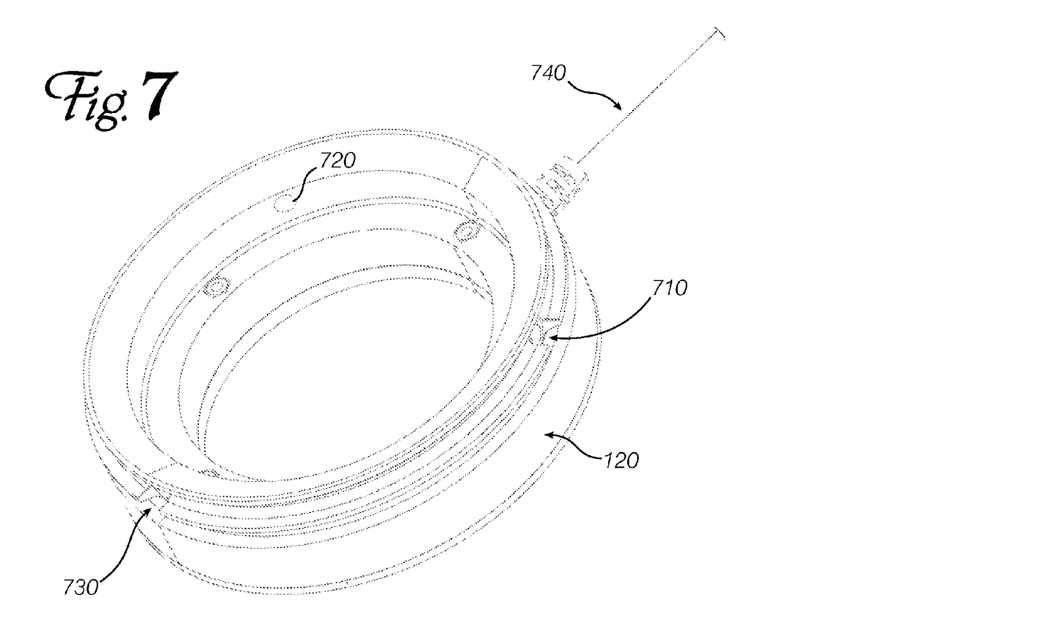
FIG. 7 is a top perspective view of an embodiment of the invention.

If the plane of the fan contains the line of the primary optical path, then the illuminated line will mark a first constraint on the field of view. By adding a second targeting laser and line-generator lens so that the planes of the illuminated fans intersect along the primary optical path, the combined system projects cross-hairs onto the subject which meet at or near the center of the field of view, without regard to the distance from the targeting lasers to the subject. This is shown in the representative model of FIG. 6, where targeting lasers 610 and 615 shine on line-generator lenses 650, 655 to produce intersecting light fans 660 and 665. The fans illuminate subject 600 along lines 670 and 675; the intersection of the lines at 680 marks the center of magnified optical field of view.

It is appreciated that an ordinary light source with a complex lens or a slit orifice can produce a fan-shaped line of illumination as described above. For example, a (non-laser) light-emitting diode ("LED") or an ordinary incandescent or fluorescent light, with a collimator lens and a line-generator lens or slit mask can generate a suitable illumination pattern. Thus, the targeting lights need not be lasers. However, the intensity of monochromatic laser light is often easier to see on a complex subject surface, so the use of lasers to produce the targeting illumination is preferred.

FIGS. 7-12 show several views of a ring light according to an embodiment of the invention. The light is adapted to be secured to an objective housing of a binocular microscope by means of set screws, in roughly the arrangement shown in FIG. 1. In the top perspective view of FIG. 7, the light's overall cylindrical or toroidal form is indicated at 120. This embodiment is secured by three set screws whose positions are indicated at 710, 720 and 730. A cord 740 carries power and control signals to the illumination and targeting lights.

The use of set screws allows the ring light to be attached to a variety of different microscopes, and allows the targeting laser(s) to be adjusted so that the target point lies within the microscope's field of view. Friction- or screw-fit product configurations are also possible; suitable attachment arrangements will be apparent to one of ordinary skill upon examination of the particular microscope to be fitted, and with reference to this disclosure's instruction to align the intersection between the planes of the targeting illumination fans with the microscope's main optical axis.

Figure 8:
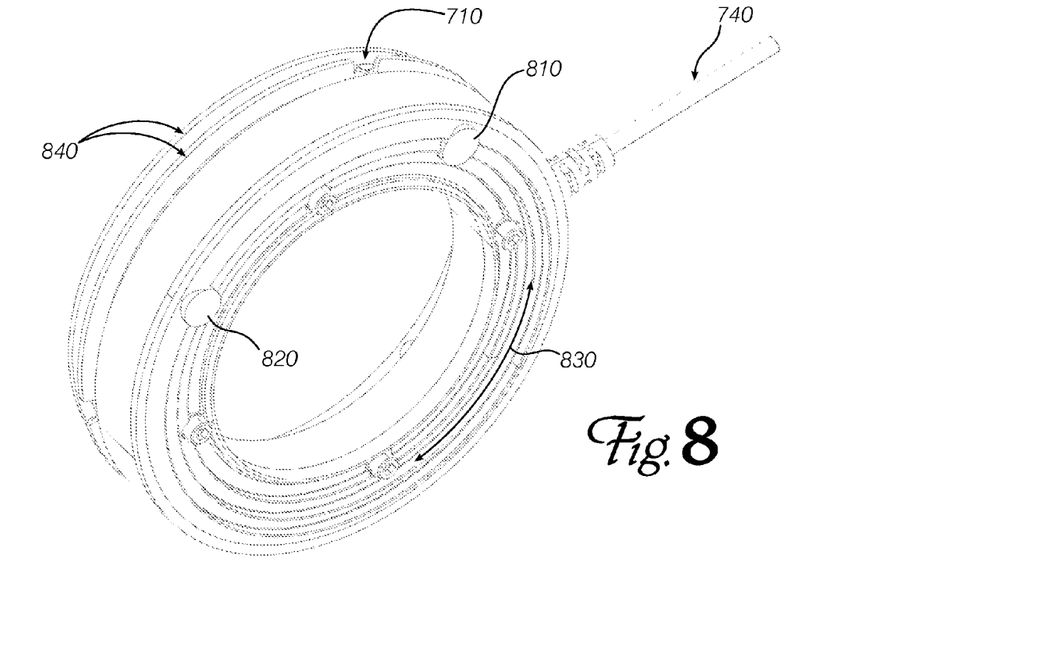
FIG. 8 is a bottom perspective view of an embodiment of the invention.

FIG. 8 shows a bottom perspective view of the ring light. When secured to the objective housing of a microscope, the lower surface of the light faces the subject on the microscope's stage. The targeting line-generator lenses, shadow masks or diffraction gratings are visible at 810 and 820; when the targeting lights are activated, these cast fans of light onto the subject. The planes of the fans are roughly perpendicular to each other, and intersect roughly along the primary optical axis of the microscope, so that the illuminated lines on the subject cross at approximately the center of the microscope's magnified field of view.

The remainder of the lower surface of the ring light is covered by a Fresnel lens 830 that conditions and focuses light from a plurality of light emitting diodes ("LEDs") placed around the ring (not visible in this view). The intensity and/or color of these LEDs may be adjustable individually or in groups to provide suitable illumination for inspection of the subject. The body of the ring light may be machined from aluminum and provided with fins 840 to help dissipate heat from the illumination LEDs and targeting lights. In other embodiments, the body may be cast or formed metal, plastic, composite or another suitable material.

Figure 9:
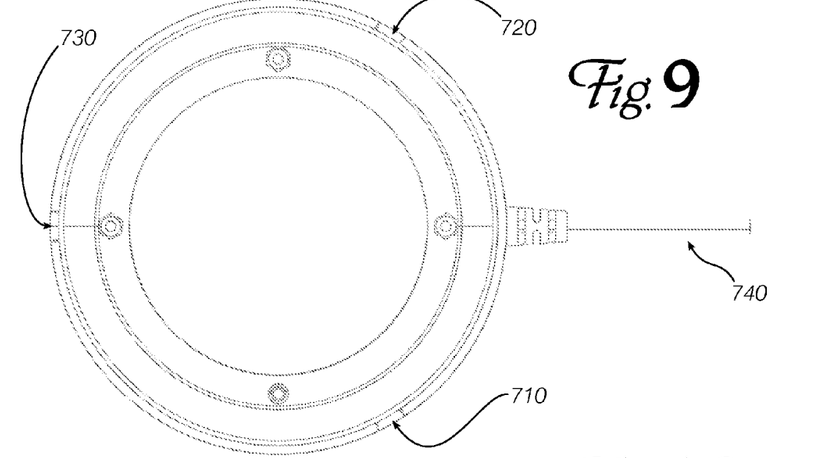
FIG. 9 is a top plan view of an embodiment of the invention.
Figure 10:
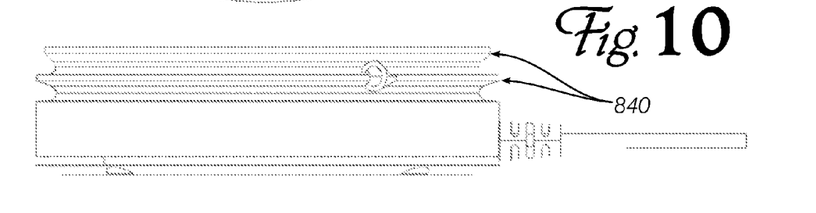
FIG. 10 is a side view of an embodiment of the invention.
Figure 11:
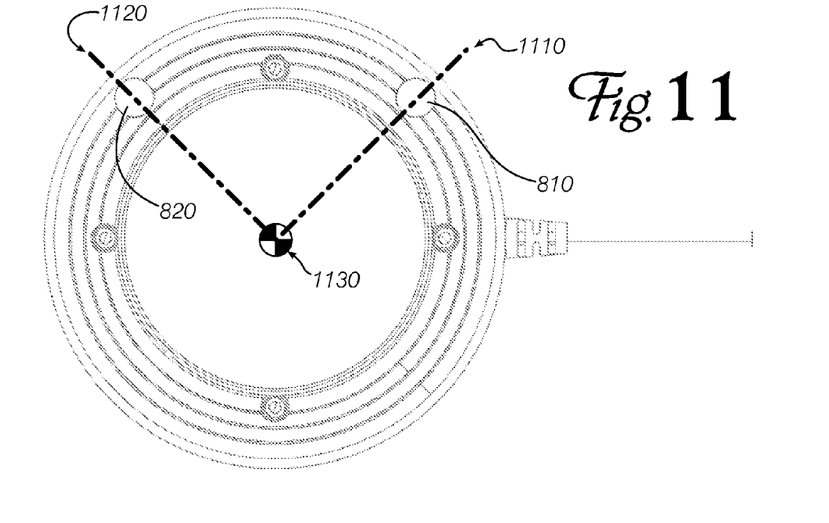
FIG. 11 is a bottom plan view of an embodiment of the invention.

FIGS. 9, 10 and 11 show top, side and bottom views of the ring light, respectively. Several features first mentioned in reference to other Figures are also marked here to assist the viewer. In FIG. 11, heavy dashed lines 1110 and 1120 indicate the targeting light pattern. The fans of light from targeting lights 810 and 820 intersect at 1130, near the optical centerline of the microscope (this view looks directly up into the microscope objective).

Figure 12:
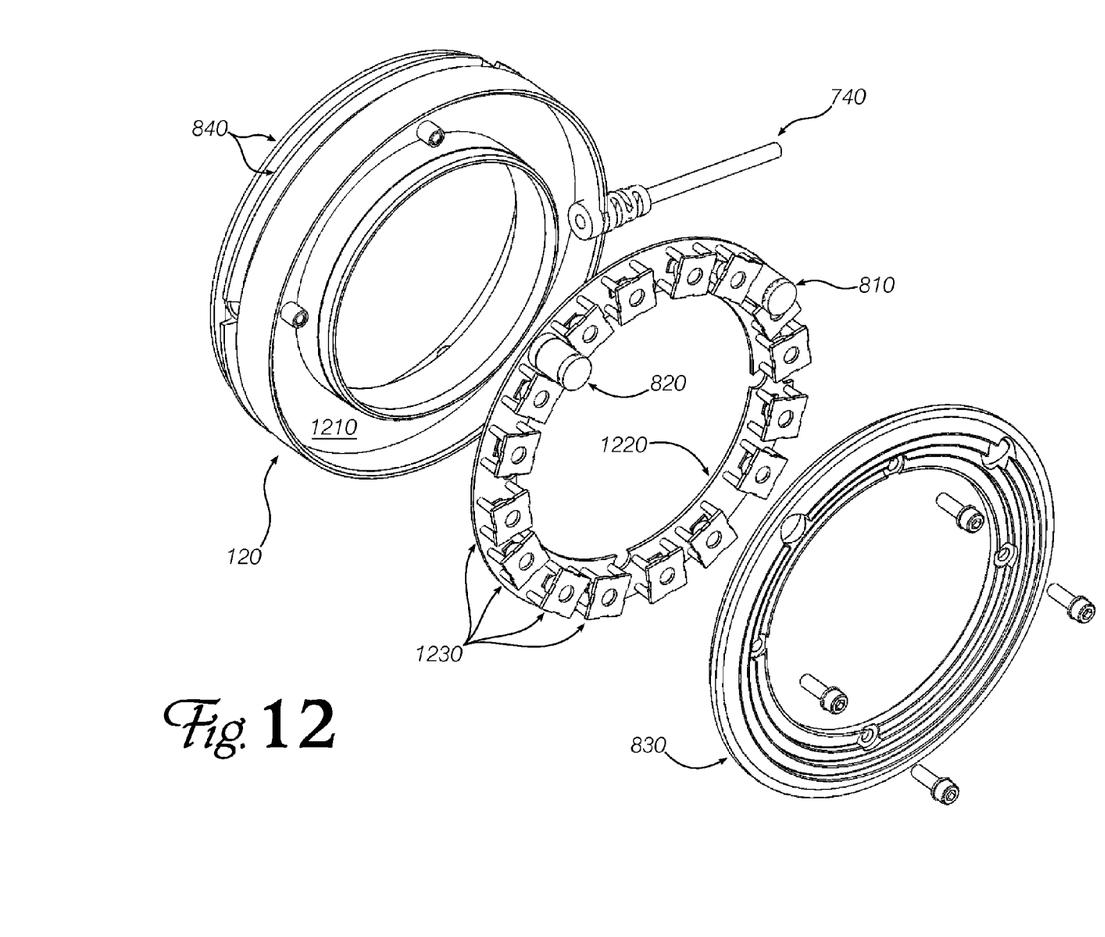
FIG. 12 is an exploded view of an embodiment of the invention.

FIG. 12 shows an exploded view of a preferred embodiment of the invention. As discussed in relation to FIGS. 7-11, this embodiment comprises a cylindrical or toroidal (ring-shaped) body 120, constructed with a cavity 1210 to accept a circular PCB 1220 carrying a plurality of illumination LEDs 1230. The LEDs are directed towards the bottom of the ring, in the direction of the microscope stage when the ring light is installed. The PCB 1220 also carries two targeting lights 810, 820, with optics for casting intersecting fans of light onto the subject. A Fresnel lens 830 covers the cavity, enclosing the LEDs and targeting lights. The lighting control system (not illustrated) may selectively activate illumination LEDs individually, in diametrically-opposed pairs, multi-LED groups or other combinations.

Figure 13:
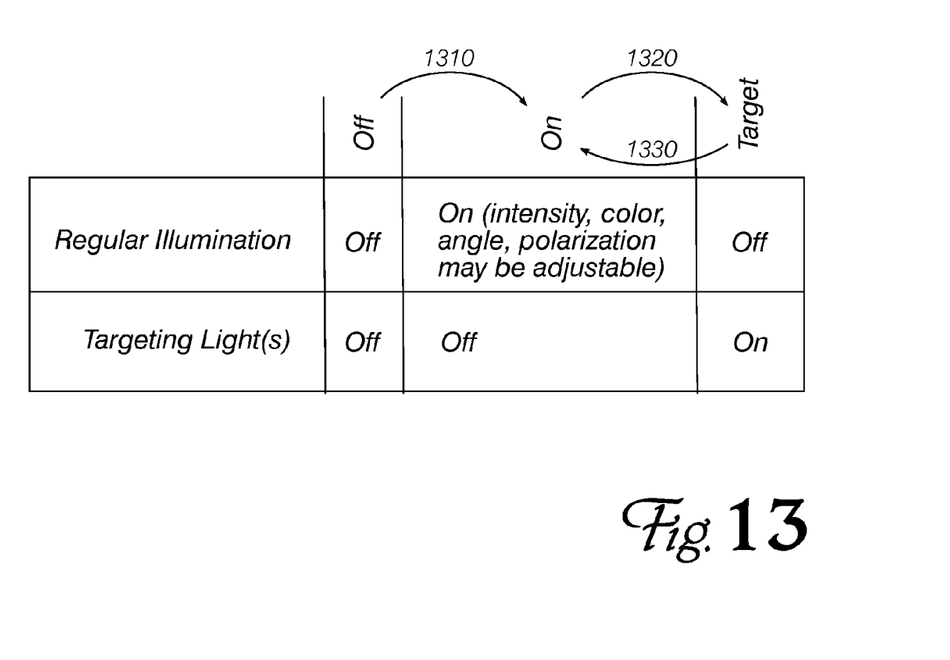
FIG. 13 is a state diagram for an embodiment that combines targeting and subject illumination features.

A preferred embodiment of the invention includes a control module to activate the various illumination sources in useful combinations. A basic state table is shown in FIG. 13. When not in use, both subject illumination and targeting illumination light sources are off. When the device is activated 1310, the regular subject lights turn on. The intensity, color, angle, polarization or other characteristics of the light may be adjustable in this state.

When the microscope user wishes to position a subject on the microscope stage, he activates the targeting function 1320. This activates the targeting illumination, and may extinguish or attenuate the subject illumination (reducing or turning off the subject illumination may improve the visibility of the targeting spot, cross-hairs or other visible design created by the targeting illumination). After a configurable period of time, the targeting function may automatically deactivate 1330, returning the device to the ordinary subject illumination mode (turning off the targeting lights, and turning the subject illumination back on). A targeting time period of 3-7 seconds is suitable in many applications. However, a wider range of adjustment, for example from 1-30 seconds, may be more generally useful.

The targeting function can be used during initial subject positioning, but is also convenient to locate under direct vision a subject feature of interest that was found in the magnified view. For example, in repairing a circuit board carrying an array of similar or identical parts, a damaged or misplaced element of the array may be identified in the magnified view. However, the array may extend over a larger area than the microscope's magnified field of view, so it may be difficult to determine exactly which one of the array elements is flawed. However, when the flawed part is centered in the magnified visual field, the targeting light can be used with direct vision to find the same part within the whole array.

Figure 14:
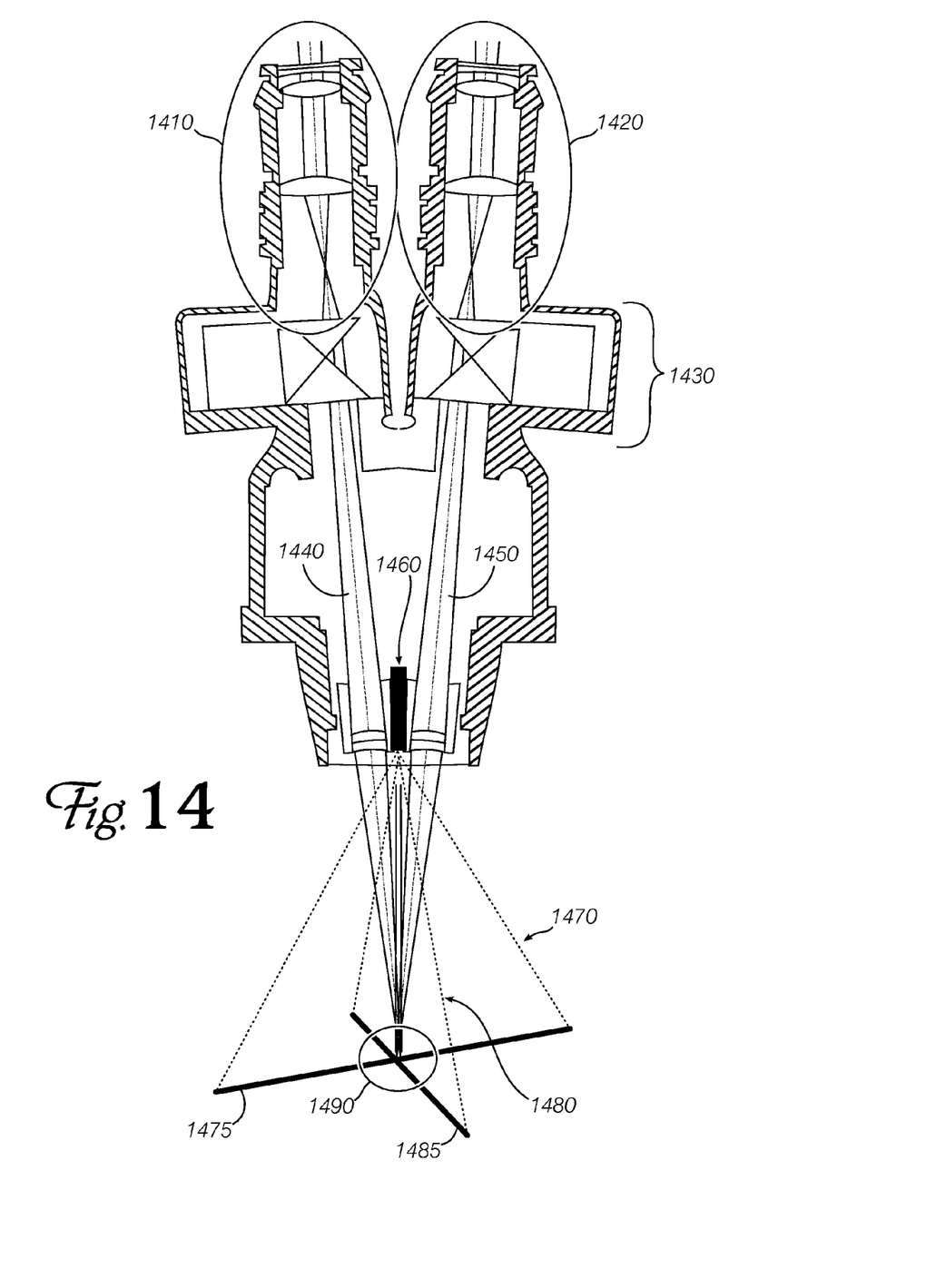
FIG. 14 is a more detailed representation of the target-positioning aid for a binocular microscope.

FIG. 14 is a more-detailed representation of a Greenough-style stereo microscope. (A Greenough microscope has two separate optical paths, one for each eye, as represented more simply in FIG. 4. An alternate microscope construction, common main objective or "CMO," has a single optical path that is split into binocular optics to improve user comfort, without providing stereo depth perception.) In FIG. 14, a partial cut-away view shows left and right eyepieces 1410, 1420, which transmit left and right images 1440, 1450 from the subject to the user's eyes. An adjustable prism stage 1430 allows the distance between the left and right eyepieces to be altered to suit the viewer.

Black rectangle 1460 represents a targeting illumination light source such as a laser light source. This is similar to the targeting laser identified as 410 in FIG. 4. A cross generator lens (not shown) produces two intersecting triangular fans of light 1470, 1480, from the targeting light source's beam. These fans fall on the subject along lines 1475, 1485, and intersect near where the left and right visual paths meet on the subject at 1490. Thus, the middle of the microscope's magnified field of view is easily perceived under direct observation when the targeting light is activated, because the targeting illumination light casts a distinctive, non-uniform pattern of light on the subject where the distinctive feature(s) are visible under both direct and magnified view—the distinctive targeting pattern helps the user correlate a location on the subject between the two different views. (The targeting light pattern is significantly different from ordinary microscope subject illumination, which is typically configured to provide even, uniform lighting.)

Various features of the present invention have been described largely by reference to specific physical embodiments. However, those of skill in the art will recognize that targeting illumination for manual positioning of a microscope subject under direct view can also be produced by different arrangements of lasers (or other light sources) and suitable optical systems. Such alternate arrangements are understood to be captured according to the following claims.

We claim:

1. A subject-positioning aid for a microscope, comprising:
means for casting a first visible-light marker on a subject; and
means for casting a second visible-light marker on the subject, said first visible-light marker and said second visible-light marker intersecting at a point and visible on the subject under direct view, said point lying within an enlarged view of the subject as seen through the microscope, wherein
the means for casting the first visible-light marker and the means for casting the second visible-light marker are fixed to the microscope; wherein
the means for casting the first visible-light marker comprises a light source and a line-generator lens to cause the light source to cast a substantially planar fan of light onto the subject, and wherein
the point at which the first and second visible-light markers intersect on the subject is substantially independent of a distance between the light-casting means and the subject.

2. The subject-positioning aid of claim 1, further comprising:
an automatic control mechanism for extinguishing the means for casting the first and second visible-light markers after a predetermined period of time.

3. The subject-positioning aid of claim 2, further comprising:
a subject-illumination light source separate from the means for casting the first visible-light marker and the means for casting the second visible-light marker, wherein
the automatic control mechanism is to attenuate the subject-illumination light source when the means for casting the first and second visible-light markers are activated, and to brighten the subject-illumination light source when the means for casting the first and second visible-light markers are automatically extinguished after the predetermined period of time.

4. The subject-positioning aid of claim 1 wherein the means for casting the first visible-light marker and the means for casting the second visible light marker are both laser light sources, each provided with a line-generator lens to cause a respective one of the laser light sources to case a substantially planar fan of light onto the subject, said line-generator lenses oriented so that the substantially planar fans of light intersect along a main optical axis of the microscope.

5. The subject-positioning aid of claim 1 wherein the means for casting the first visible-light marker is a laser light source including a lens to cause the laser light source to cast a substantially planar fan of light onto the subject.

6. The subject-positioning aid of claim 1 wherein the first and second visible light markers are illuminated lines on a surface of the subject.

7. A microscope comprising:
an optical system for providing an enlarged field of view of a subject;
a targeting illumination system fixed to the optical system for projecting a distinctive, non-uniform pattern of light on the subject so that a portion of the pattern of light is visible under direct view and the portion of the pattern of light is visible in the enlarged field of view; and
a control system for activating and deactivating the targeting illumination system, wherein the targeting illumination system comprises a first laser illumination source and a first line-generator lens to illuminate a first line on the subject; and a second laser illumination source and a second line-generator lens to illuminate a second line on the subject, the first and second lines intersecting at the portion of the pattern of light, the targeting illumination system oriented so that a location of the portion of the pattern of light on the subject does not change position significantly with changing distance between the subject and the optical system.

8. The microscope of claim 7 wherein the targeting illumination system comprises:

a laser illumination source; and a cross-generator lens to form the distinctive, non-uniform pattern of light, wherein the laser illumination source together with the cross-generator lens illuminates two intersecting lines on the subject, said lines intersecting at the portion of the pattern of light.

9. The microscope of claim 7 wherein the distinctive, non-uniform pattern of light is a cross-hair.

10. The microscope of claim 7 wherein the distinctive, non-uniform pattern of light is an illuminated spot covering less than all of the enlarged field of view.

11. The microscope of claim 7 wherein the distinctive, non-uniform pattern of light is a laser spot on the subject.

12. The microscope of claim 7 wherein:

the first laser illumination source and first line-generator lens cast a first fan-shaped light beam toward the subject;

the second laser illumination source and the second line-generator lens cast a second fan-shaped light beam toward the subject;

a first plane of the first fan-shaped light beam and a second plane of the second fan-shaped light beam both containing a line of a primary optical path of the optical system; and the first plane and the second plane intersect along the line of the primary optical system.

* * * * *